United States Patent [19] [11] 4,223,323
Bader et al. [45] Sep. 16, 1980

[54] INK JET PRINTER

[75] Inventors: Leonhard Bader, Stadtbergen; Frank Giessner; Helmut Weber, both of Augsburg, all of Fed. Rep. of Germany

[73] Assignee: NCR Corporation, Dayton, Ohio

[21] Appl. No.: 969,903

[22] Filed: Dec. 15, 1978

[51] Int. Cl.[2] .................... G01D 15/18
[52] U.S. Cl. .................... 346/140 R; 346/75
[58] Field of Search .................... 346/140 R, 75

[56] References Cited

U.S. PATENT DOCUMENTS

| | | | |
|---|---|---|---|
| 3,290,691 | 12/1966 | Leidy, Jr. | 346/140 R X |
| 3,373,435 | 3/1968 | Strong | 346/140 R |
| 3,771,165 | 11/1973 | Kurimoto et al. | 346/140 R |
| 3,787,884 | 1/1974 | Demer | 346/140 R X |
| 3,798,656 | 3/1974 | Lowy et al. | 346/140 R X |
| 3,852,773 | 12/1974 | Sicking et al. | 346/140 R |
| 4,136,346 | 1/1979 | Parkinson | 346/140 R |

*Primary Examiner*—George H. Miller, Jr.
*Attorney, Agent, or Firm*—J. T. Cavender; Wilbert Hawk, Jr.; George J. Muckenthaler

[57] ABSTRACT

Means for supplying ink to a plurality of individually-spaced movable print heads is caused to be moved in a direction therewith but which ink supply means is positioned and directed in a manner perpendicular to the direction of movement of the print heads. An ink container is fixed at a distance from the print heads and a separate flexible ink supply tube, extending substantially in a vertical direction, connects the container with each individual print head. The ink supply tubes are movably swung or pivoted as the print heads are caused to be laterally moved and the swinging or pivoting movement of the supply tubes prevents interruption of the flow of ink to the print heads upon reversal of travel thereof at the ends of the printing lines.

13 Claims, 4 Drawing Figures

INK JET PRINTER

BACKGROUND OF THE INVENTION

In the high-speed printing field, the wire matrix printer, the thermal printer and the ink jet printer have demonstrated that both impact and non-impact printing concepts are useful in the various types of printing devices. It is of course well-known that the wire matrix printer and the ink jet printer have each utilized a composite or integral print head which includes a plurality of drivers arranged in a manner to be supported and carried as a unit and caused to be moved or driven in a lateral or transverse direction in a reciprocating or back-and-forth motion across the printer.

In the case of the ink jet printer, the print head may be a multiple nozzle type with the nozzles aligned in a vertical line and with the ink supply elements for the individual nozzles arranged in a circular or other manner in order to achieve a compact unit. However, there are various applications where the use of a multiple nozzle print head is too expensive for the particular printing concept.

As an alternative to the multiple-nozzle type print head and in the case of certain recording devices, a plurality of equally-spaced single print heads are caused to be moved in back-and-forth manner to print lines of dots in making up the lines of characters. One such device is shown and described in U.S. Pat. No. 3,789,969 issued to R. Howard et al on Feb. 5, 1974. One of the problems encountered in the use of such equally spaced print heads which receive ink from a common ink supply is that of maintaining an even flow of ink to each of such print heads at all times throughout printer operation in the back-and-forth movement of the print heads or in a bi-directional printing manner. In a bi-directional printer, that is, one that prints in both directions of travel or movement of the print head, there are times when the printing is continued to the ends of the lines and the ink must be immediately available at the nozzle for printing in a return direction. However, at the end of each line of dots in the case of the equally spaced head ink jet printer, the sudden change in direction of the print heads creates deceleration forces and acceleration forces which forces act upon the ink in the print heads and which forces lead to oscillations in the nozzles and, under certain conditions, to air bubbles and interruptions or intermissions in the flow of ink to the nozzles of the print heads.

Representative prior art in ink jet recording devices of the type previously mentioned includes German Pat. No. 2,539,983, wherein the ink supply to the printing elements occurs through a hose-shaped flexible line connected with an ink container being secured in position. The known devices may be susceptible to high accelerations upon reversal of the printing elements and the disadvantage of such high reversal forces and irregularities or interruptions in the flow of ink to the print head may lead to improper functioning or failure of the printing elements.

SUMMARY OF THE INVENTION

The present invention relates to an ink jet printer and more particularly to a printer comprising a plurality of printing elements arranged on a carriage which is caused to be moved in a direction transverse to the direction of travel of the record medium. The printing elements, being in the nature of ink drive elements, are individually and equally spaced in a line across the printer and each element has an ink supply line connected thereto and directed downwardly at substantially a right angle to the direction of movement of the ink drive elements. The ink supply lines are made of flexible material and are connected to a header or main supply line of rigid nature and which main supply line is connected with the ink supply container which is secured at one side of the printer.

When the ink drive element carriage is caused to be moved back-and-forth across the printer, the several ink supply lines which are directed in a manner substantially normal to the path of ink flow through the printing elements or print heads are caused to be moved or pivoted a predetermined amount from a normal line of placement. The individual ink supply lines may all be flexible and thereby pivot or move the required amount through a predetermined angle, or the individual lines may be substantially rigid and a single line feeding the ink supply lines may be flexible to enable the pivoting motion and thereby permit the required movement.

The effects of acceleration and deceleration of the printing elements on the supply of ink thereto is minimized by the positioning of the ink supply lines in relation to the printing elements so as to maintain a constant supply of ink.

In view of the above discussion, the principal object of the present invention is to provide an ink jet recording device with maintained flow of ink to the nozzles of the device.

Another object of the present invention is to provide a plurality of ink supply lines for an ink jet recording device in an arrangement to prevent oscillations of ink through the print heads and the nozzles and onto the record medium.

An additional object of the present invention is to provide an arrangement of ink supply lines to the ink jet print heads to prevent formation of air bubbles in the print heads.

A further object of the present invention is to provide individually-spaced ink supply lines for ink jet printing elements wherein the lines are directed normal to the path of ink flow and are pivotable in relation to a main supply line as the printing elements are moved in a direction transverse to the individual supply lines.

Additional advantages and features of the present invention will become apparent and fully understood from a reading of the following description, taken together with the annexed drawing.

DESCRIPTION OF THE PREFERRED EMBODIMENT

Figure 1:
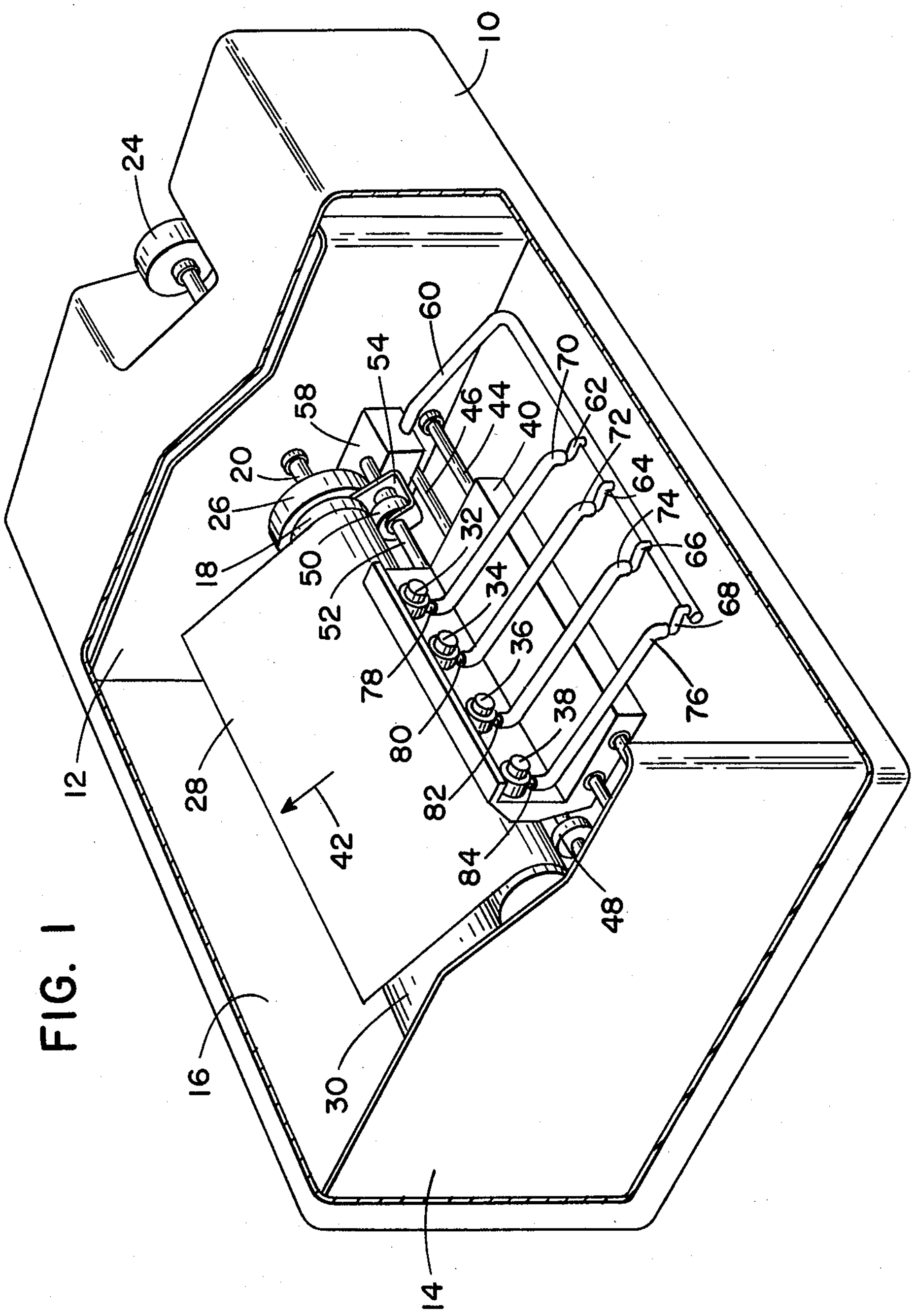
FIG. 1 is a simplified perspective view of an ink jet recording device incorporating the features of the present invention.
Figure 2:
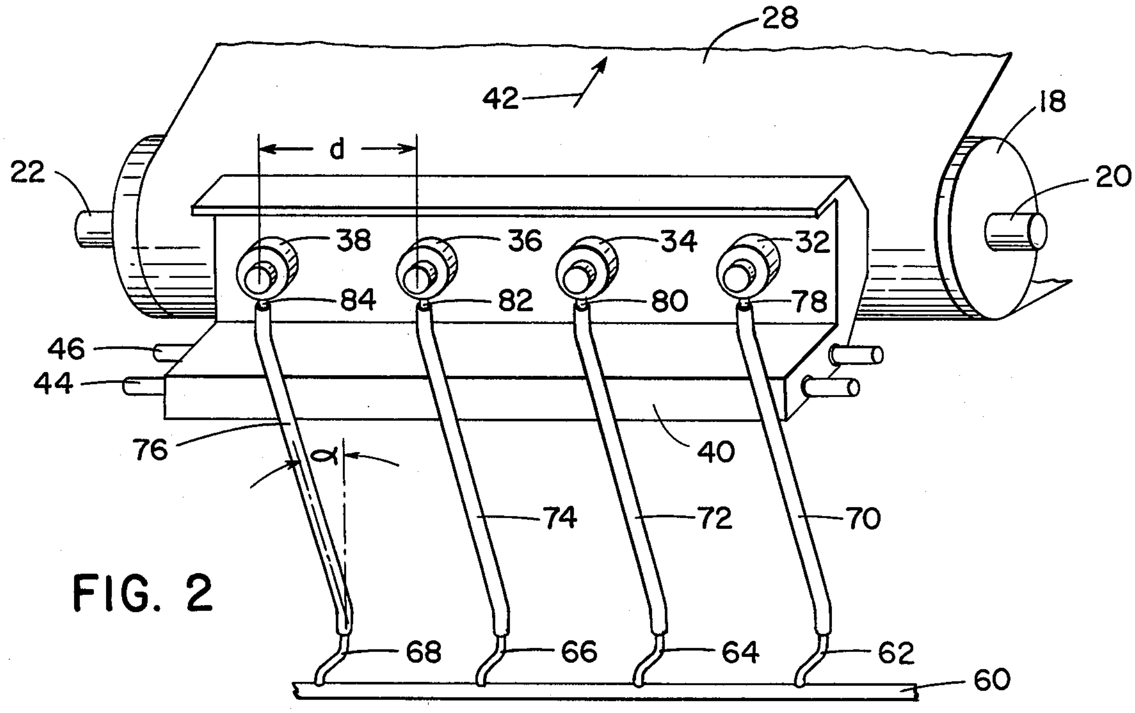
FIG. 2 is an enlarged view of a portion of the recording device and showing the printing elements according to FIG. 1.

Referring now to FIGS. 1 and 2 of the drawing, the ink jet recording device as shown in the perspective view of FIG. 1 includes a housing 10 which has on the inside thereof a right side portion 12 and a left side portion 14, which portions 12 and 14 assume the nature of walls in the device and are in the usual manner connected with the housing 10 in which the required parts of the recording device are supported or secured at the sides thereof in well-known manner. Those parts which are not immediately necessary or required for the understanding of the invention, for example, certain driving means and drive members, have been omitted from the drawing for reasons of clarity and to simplify the showing of the inventive portion.

In FIG. 1 the ink jet recording device, which may be in the form of a printer, has arranged therein between the side portions 12 and 14 and forward of a rear wall 16, a space or area for a roller or platen 18 which by reason of a shaft having a right end shaft portion 20 and a left end shaft portion 22 (as shown in FIG. 2) is rotatably supported in the side portions or walls 12 and 14. The roller 18 can, with the aid of a hand wheel or knob 24, be manually rotated, or by means of a driving member which is not shown, be mechanically or automatically rotated through a drive wheel 26 at the right side of roller 18. This causes a record medium 28 to be driven or transported from a supply roll 30 in the rear portion of the printer or recording device around the roller 18 and past a printing station which occupies a space at the front of the roller 18 so that the record medium 28 can be printed by printing elements 32, 34, 36 and 38. Such printing elements are arranged in side-by-side spaced fashion on a carriage or carrier support 40 which is movable transverse to the transport or driven direction of the record medium 28, as shown by the arrow 42.

The carrier support 40 can, through generally-known driving means, be moved back and forth in a line printing direction on guide rods 44 and 46, such movement of the carrier support being transverse to the transport or driving direction 42 of the record medium 28. The guide rods 44 and 46 for the carrier support 40 are likewise secured in the side portions or walls 12 and 14 of the recording device 10.

The record medium 28 is pressed against the roller 18 by pressure rolls 48 and 50, FIG. 1, thus insuring a good abutting contact with the roller and a safe transport of the record medium past the printing station. The pressure rolls 48 and 50 are rotatably arranged on an axle 52 which has its left end secured to the side portion 14 and has its right end connected to the shaft portion 20 through a U-shaped support member 54. The printing elements 32, 34, 36 and 38 are inserted and secured in bores or apertures provided in the carrier support 40 so that the nozzle of each of the printing elements, such as nozzle 56 of the printing element 32 as shown in FIG. 3, are positioned along the line of printing and opposed to the record medium 28 on which printing is to be made.

The supply of ink for the printing elements 32, 34, 36 and 38 is brought about from an ink container 58, FIG. 1, which is secured to the right side portion 12 and from which container 58 there leads a common stationary supply tube 60. The supply tube 60 includes branch lines 62, 64, 66 and 68, FIG. 2, which are connected with movable or flexible supply lines 70, 72, 74 and 76 respectively, extending and leading to the printing elements 32, 34, 36 and 38. As illustrated, the supply lines 70, 72, 74 and 76 are connected with the printing elements 32, 34, 36 and 38 through connecting pieces 78, 80, 82 and 84.

In the preferred embodiment as described herein, the common supply tube 60 is a rigid tube of sufficient stability to follow a path downwardly from the ink tank or container 58 and span the distance across the carrier support 40 so as to be substantially under the inlets to the respective printing elements 32, 34, 36, 38. It is to be understood of course that in case there should be an increased stability desired, the lower horizontally-extending portion of the supply tube 60 may be connected with a stabilizing bar which in turn can be fastened at the bottom of the housing 10. The branch lines 62, 64, 66 and 68 and the connecting pieces 78, 80, 82 and 84 are rigid tubes so that the supply lines 70, 72, 74 and 76 which may consist of flexible plastic hoses are easily attachable thereon. The flexible hoses 70, 72, 74 and 76 enable movement of the carrier support 40 with the printing elements arranged thereon along the guide rods 44 and 46 in the line of printing direction on the record medium 28. The alterations in length or distance, respectively, between the movable printing elements 32, 34, 36 and 38 and the stationary branch lines 62, 64, 66 and 68, as a result from such movement, can thus be compensated for by the flexible supply lines 70, 72, 74 and 76. The importance of the ink supply system will hereinafter be described in detail in connection with FIG. 2 and with reference to FIG. 3 in connection therewith which shows one of the printing elements 32 as used in the embodiment described herein.

Figure 3:
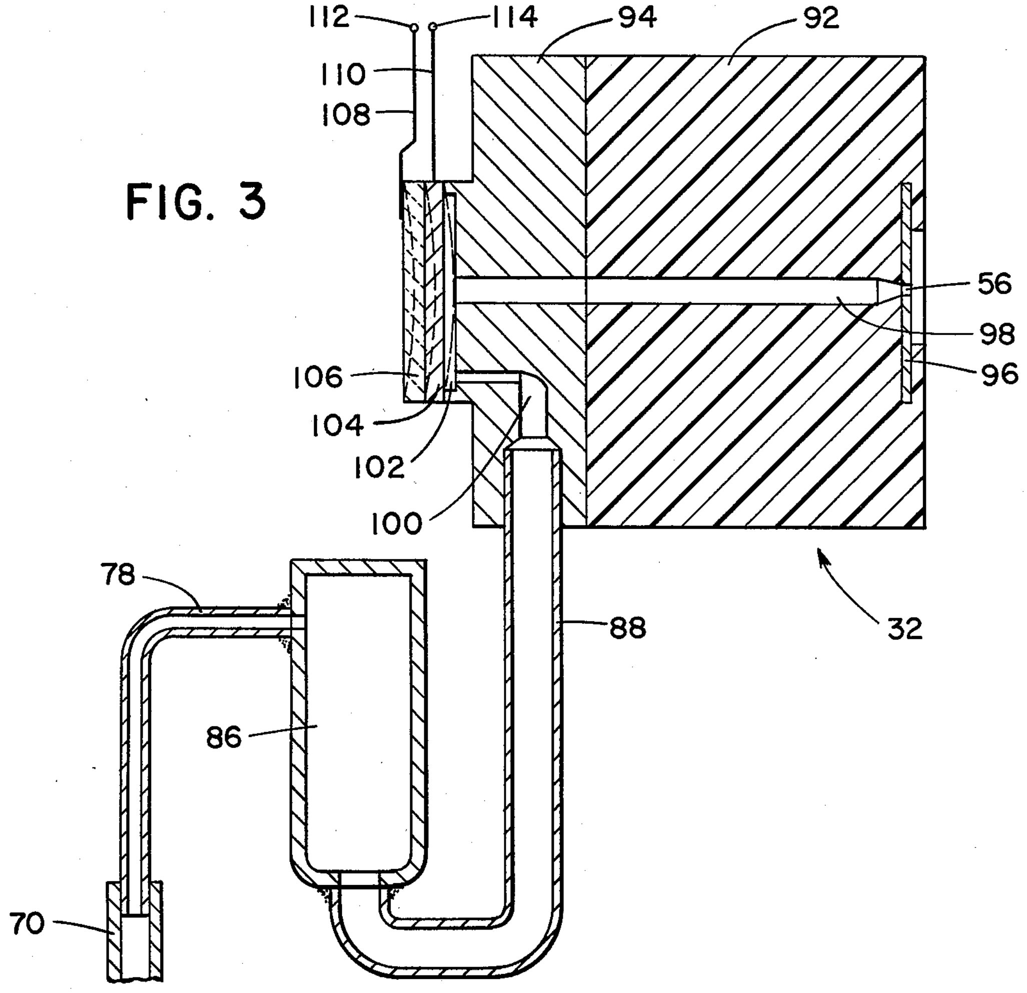
FIG. 3 is an enlarged sectional view of one of the printing elements used in the ink jet recording device shown in FIGS. 1 and 2.

The printing element 32, as representatively shown in FIG. 3 and as already pointed out, is arranged in a bore or aperture of the carrier support 40, as seen in FIGS. 1 and 2, in such manner that its nozzle 56 is positioned opposite the record medium 28 to be printed upon at a distance of approximately one millimeter. The rear end of the printing element on which the drive parts are arranged projects out of the carrier support 40 in such manner and extent that the flexible line 70 associated with the element 32 can be connected with the piece 78 of such element.

Each of the printing elements 32, 34, 36 and 38 shown in the embodiment according to FIGS. 1 and 2 has preferably associated therewith an intermediate ink container 86. The intermediate containers 86 are not shown in FIGS. 1 and 2 for reasons of clarity, but rather are shown in representative form in the enlarged and more detailed sectional view of the printing element 32 in FIG. 3. The intermediate container 86 can, for instance, be a small vessel at the bottom portion of which there is secured a rigid tube 88 leading into the printing element 32. At the upper portion of the intermediate container 86 there is included the rigid tube 78 over which, as was already stated in connection with the description of FIG. 1, the flexible hose 70, also seen in FIGS. 1 and 2, can be installed in a simple manner. The intermediate container 86 is always filled with liquid ink whereby the level of the ink lies above the lower portion of the tube 88 and the intermediate container 86 must be hermetically sealed so that the air space above the level of the ink liquid and in the upper portion of the container 86 can act as a damping cushion over the ink which is in the tube 88 leading to the print element 32. By the arrangement of the intermediate container 86 for each one of the printing elements 32, 34, 36 and 38, the recording device is more resistant to extreme changes in acceleration of the print elements in the side-to-side direction so that acceleration forces or values in excess of ten times the force of gravity are considered to be harmless in the operation of the recording device.

The representative printing element 32 in FIG. 3 consists of a front portion 92 which, by appropriate securing means such as a suitable adhesive, is connected with or secured to a rear portion 94. The front portion 92 is preferably made of plastic and includes a cast-in nozzle plate 96 which defines the nozzle opening 56 at the end of an ink channel 98. The rear portion 94 is preferably made of metal and is provided with a supply channel 100 into one end of which the tube 88 extends and from which tube 88 the supply channel 100 extends to and terminates in a capillary cavity 102 which is hermetically sealed by a membrane 104. The membrane 104 is connected with or secured to a piezoelectric crystal 106 having leads 108 and 110 to carry voltage pulses applied to input terminals 112 and 114 for actuating the piezo crystal.

Energization of the piezoelectric crystal 106 brings about a deflection thereof and consequently, the membrane 104 is caused to be deflected, as seen in the dashed lines of FIG. 3, wherein there occurs the increase in pressure in the cavity 102 and in the nozzle channel 98 extending between the nozzle 56 and the capillary cavity 102. When a certain predetermined overpressure is reached in the cavity 102 by activation of the crystal 106, an ink droplet is ejected at high speed from the nozzle 56 and impinges on the record medium 28.

By reason of a minimum pressure following each maximum pressure, which happens immediately as the piezo crystal 106 is deactivated and restores quickly to its normal non-deflected condition, the printing element 32 is automatically provided with ink thrugh the supply channel 100, the intemediate container 86, the supply line 70, the supply tube 60 and from the ink container 58, as seen in FIGS. 1, 2 and 3.

In case it should be necessary for reason of stability in the system, the intermediate container 86, for instance, consisting of a metal vessel or a plastic vessel, can be secured to the carrier support 40 with conventional clamps or fasteners in well-known manner.

Referring to FIG. 2, hereinafter is described in detail the principle as underlying the present invention with only those parts being shown which are necessary for the description of the invention. As has already been stated, the ink supply to the printing elements 32, 34, 36 and 38 occurs from an ink container 58 secured to the right side portion 12 of the printer 10 through the stationary supply tube 60, as seen in the overall arrangement in FIG. 1. The supply tube 60 is preferably a metal tube extending in the direction of movement of the printing elements 32, 34, 36, 38 and comprises branch lines or connecting pieces 62, 64, 66 and 68 which are likewise preferably metal tubes. In the rest position or that position when the carrier support 40 is in a medium or middle position over the platen or roller 18, the connecting pieces 62, 64, 66 and 68 are directly below the printing elements 32, 34, 36 and 38, respectively associated therewith. In this case, there exists an angle of approximately ninety degrees between the individual flexible supply lines 70, 72, 74 and 76 and the common supply tube 60. The printing elements 32, 34, 36 and 38 are arranged on the carrier support 40 with each element being spaced or separated by a distance d as seen in FIG. 2, and likewise the connecting pieces 62, 64, 66 and 68 are so spaced along the stationary supply tube 60. The carrier support 40 can be moved along the guide rods 44 and 46 by at least the distance d so that with the printing elements 32, 34, 36 and 38, each point along a print line extending normal to the record medium 28 direction of movement can be printed in regular operation. Hence, with the record medium appropriately moved in the direction of the arrow 42, the movement and individual selection of the printing elements 32, 34, 36 and 38 permit any desired printing pattern, as for example, letters, numbers or pictures, to be produced across the face of the record medium 28.

As already stated, the supply lines 70, 72, 74 and 76 are flexible hoses so that upon movement of the carrier support 40 from its rest or middle position to the full left, as seen in FIG. 2, there occurs a pivoting or flexing of such supply lines by an angle $\alpha$ to the left from the normal or perpendicular line. Then, if the printing elements 32, 34, 36 and 38 are moved to the full right position, the maximum pivoting angle of the supply lines 70, 72, 74 and 76 at such time is two times the angle $\alpha$, as being the total angle of displacement from an extreme right to an extreme left position of the carriage 40. Through the type of ink supply according to the present invention, namely, by using the flexible supply lines 70, 72, 74 and 76, any occurring acceleration is essentially reduced by maintaining a small pivoting angle since the supply of the ink from the stationary supply tube 60 to the printing elements 32, 34, 36 and 38 does not occur through supply parts, i.e., lines 70, 72, 74 and 76, which are lying in the direction of movement of the printing elements. The smaller the pivoting angle, the more resistance is effective toward high acceleration forces of the recording device, so that with the distance d of the printing elements 32, 34, 36 and 38 remaining constant and the length of the supply lines 70, 72, 74 and 76 increasing, the pivoting angle thereby becomes smaller. The same principle applies when the length of the supply lines 70, 72, 74 and 76 remains constant and the distance d between the printing elements becomes smaller, which can be a consequence of a factor in an increasing number of printing elements carried on the support 40.

The functioning principle underlying the present invention therefore consists in that the ink flow to the printing elements 32, 34, 36, 38 relative to the direction of movement of the elements occurs through supply lines 70, 72, 74 and 76 maintained approximately at angles of ninety degrees. Tests have shown that the printing system resistance to high acceleration forces, for instance, at an entire pivoting angle of the perpendicular supply lines 70, 72, 74 and 76 by an amount of eleven degrees, increases to more than three times relative to a horizontal positioning of the supply lines. The high acceleration values occur, as already stated, especially at the reversal of direction points of the carrier support 40 or, respectively, of the printing elements 32, 34, 36 and 38. While it is beneficial to maintain the pivoting or flexing angle as small as possible, the range of total angular movement may be from three degrees to twenty degrees for acceptable printing operation.

The position of the printing elements 32, 34, 36 and 38 and the arrangement of the included ink channels 98, as seen in FIG. 3 for each of the elements, is chosen so that the channels in the printing elements, relative to the direction of movement of the printing elements define an angle of ninety degrees so that in the nozzles 56 and the nozzle channels 98 there are no acceleration forces occurring or acting in the direction of the channel path.

Instead of the single nozzle printing element 32, 34, 36 or 38 as used according to FIGS. 1, 2 and 3 of the present invention, there may also be used multiple nozzle printing elements. For instance, the multiple nozzle print elements or heads as described in a co-pending application Ser. No. 969,904 and filed by the applicants on the same day as the present application can be successfully used instead of the single nozzle printing element. In the multiple nozzle usage, it is merely necessary that the respective supply lines 70, 72, 74 and 76 be attached to the supply channels of respective ones of the multiple nozzle print heads which are secured to the carrier support 40 in a suitable manner. By this use of the multiple nozzle print heads, the need for intermediate containers 86 as seen in FIG. 3 becomes superfluous, since with the multiple nozzle print heads according to applicant's further invention as described in the co-pending application, such intermediate containers are already included in the print heads.

Figure 4:
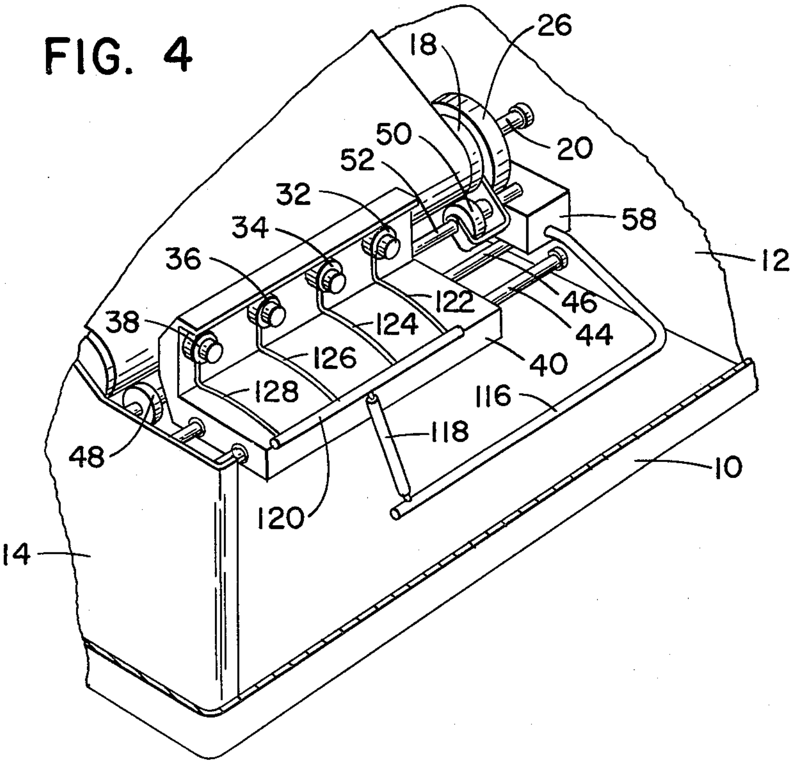
FIG. 4 is a perspective view of a portion of an ink jet recording device showing a second embodiment or a modification of the device of FIG. 1.

A further embodiment of the present invention is shown in FIG. 4 wherein the printing elements 32, 34, 36 and 38 are connected with a common stationary supply tube 116. The common supply tube 116 of the structure shown in FIG. 4 is connected with a vertical pivotable supply portion 118 which may likewise consist of a flexible plastic hose. The upper portion of the supply hose or tube 118 has connected thereto a distributor element or header 120 and the individual printing elements 32, 34, 36 and 38 are connected with lines 122, 124, 126 and 128 to such distributor element or header 120. In the structure shown in FIG. 4, the stationary common supply tube 116, the individual supply lines 122, 124, 126 and 128, and the distributor element 120 likewise may consist of metal tubes so that only the pivotable supply portion or hose 118 needs to be a flexible member.

As a comparison between FIGS. 1 and 4 illustrates, with the embodiment of FIG. 4 only the single supply portion 118 must be pivoted and this may alleviate certain structural features. Since, however, the distributor element 120 extends parallel to the direction of movement of the printing elements 32, 34, 36 and 38, it can be seen that a high printing speed is not reached with the structure shown in FIG. 4 when compared with that of the preferred embodiment shown in FIGS. 1 and 2. Consequently, under equal construction conditions and with the number of printing elements being equal as well as the pivoting angle $\alpha$ being equal, there will occur higher acceleration forces with the structure shown in FIG. 4 as compared with the preferred embodiment of FIGS. 1 and 2. The modification or the second embodiment of FIG. 4 is thus a compromise, which in various cases of application represents an ink jet recording device sufficiently resistant to high deceleration and acceleration forces which may be detrimental to the flow of ink through the printing elements.

It is thus seen that herein shown and described is an ink jet recordng device in the form of a printer which provides flexibility in the supply of ink to the printing elements so as to minimize or alleviate the effects of acceleration and deceleration of the printing elements at the reversal in direction points during travel thereof under operating conditions. The path of the ink supply conduit or passageway is positioned substantially perpendicular to the direction of travel of the printing elements so as to provide pivotal action in relation to the stationary parts. The ink jet recording device of the present invention enables the accomplishment of the objects and advantages mentioned above, and while a preferred embodiment and a modification thereto have been disclosed herein, other variations thereof may occur to those skilled in the art. It is contemplated that all such variations and modifications not departing from the spirit and scope of the invention hereof are to be construed in accordance with the following claims.

What is claimed is:

1. In an ink jet printer, means for supplying ink in continuous manner to a plurality of ink jet print heads movable in back and forth direction across the printer comprising: an ink container secured to said printer and including rigid conduit means extending in the direction of movement of said print heads, and a plurality of flexible passageways pivotally connected with said conduit means and flexibly connected with respective print heads for supplying ink thereto, said passageways extending substantially perpendicular to the direction of movement of said print heads and being constructed to have one end thereof distal from said conduit means swingably movable a predetermined distance in the direction of movement of said print heads.

2. In the printer of claim 1 wherein each of said print heads includes an ink channel extending transverse to the direction of travel of said print heads.

3. An ink jet printer having a platen, a plurality of spaced print heads operable with the platen and movable therealong, and means for supplying ink to said print heads comprising: an ink supply container secured to said printer, rigid conduit means connected in fixed manner to said container and extending in the direction of movement of said print heads, and a plurality of flexible tubes pivotally connected with said conduit means and flexibly connected with respective print heads, said flexible tubes extending generally perpendicular to the direction of movement of said print heads and having one end thereof pivotable with respect to said conduit means through a minimum angle of displacement therewith while maintaining flow of ink to said print heads.

4. The printer of claim 3 wherein said print heads comprise a plurality of spaced-apart printing elements disposed in aligned manner along said platen and said plurality of lines are positioned substantially normal to the direction of movement of said printing elements.

5. The printer of claim 3 including an intermediate ink container connected with said print heads for providing damping of the ink prior to entry thereof into the print heads.

6. The printer of claim 3 wherein the print heads are spaced along a line from each other and are angularly displaced with respect to said conduit means within the range between 3° and 20°.

7. The printer of claim 3 wherein said print heads are spaced by a predetermined distance one from the other and are movable said distance along said platen.

8. The printer of claim 3 wherein each of said lines includes a piece connected with said conduit means at locations spaced corresponding to the spacing of said print heads, and said print heads are movable a minimum angular amount in each direction from a middle position in relation to the location of the connecting pieces.

9. The printer of claim 3 including an intermediate ink container connected with said print heads for providing damping of the ink prior to entry thereof into the print heads.

10. An ink jet recording device comprising: a plurality of printing elements spaced one from the other in aligned manner, a carriage for carrying said printing elements in bidirectional transverse movement for printing on record media adjacent said carriage, and means supplying ink to said printing elements consisting of a stationary ink container extending along said carriage, an elongated ink container on said carriage and movable therewith and flexible means pivotally connected with said stationary ink container and connected with said elongated ink container and extending in a direction substantially perpendicular to the direction of movement of said printing elements and having one end movable therewith in providing an angular displacement of minimum amount between the stationary ink container and the elongated ink container while maintaining a constant supply of ink to said printing elements.

11. The ink jet recording device of claim 10 including a plurality of conduits connected with said printing elements and wherein said flexible means comprises a passageway connecting said stationary and said elongated ink containers.

12. The ink jet recording device of claim 10 wherein said stationary ink container comprises rigid conduit means and said elongated ink container comprises rigid conduit means movable with said carriage.

13. The ink jet recording device of claim 10 wherein said flexible means comprises a flexible conduit pivotable in relation to said stationary ink container and having on end thereof swingably movable a predetermined distance in the direction of movement of said print elements.

* * * * *